United States Patent
Stadjuhar, Jr.

(10) Patent No.: US 10,289,429 B2
(45) Date of Patent: May 14, 2019

(54) MULTIPLE SIGN CONTROLLER SYSTEM USING MULTIPLE VIRTUAL SIGN CONTROLLERS

(71) Applicant: Robert Charles Stadjuhar, Jr., Colorado Springs, CO (US)

(72) Inventor: Robert Charles Stadjuhar, Jr., Colorado Springs, CO (US)

( * ) Notice: Subject to any disclaimer, the term of this patent is extended or adjusted under 35 U.S.C. 154(b) by 0 days.

(21) Appl. No.: 15/009,185

(22) Filed: Jan. 28, 2016

(65) Prior Publication Data

US 2017/0220429 A1    Aug. 3, 2017

Related U.S. Application Data

(60) Provisional application No. 62/110,507, filed on Jan. 31, 2015.

(51) Int. Cl.
*G06F 11/20* (2006.01)
*G06F 9/4401* (2018.01)
(Continued)

(52) U.S. Cl.
CPC .......... *G06F 9/442* (2013.01); *G06F 11/1658* (2013.01); *G06F 11/202* (2013.01); *G06F 11/0757* (2013.01); *G06F 11/2005* (2013.01); *G06F 11/2015* (2013.01); *G09F 2009/3055* (2013.01)

(58) Field of Classification Search
CPC ... H04N 5/66; H04N 5/68; H04N 5/70; G09F 2009/3055; G06F 11/202
See application file for complete search history.

(56) References Cited

U.S. PATENT DOCUMENTS 5,594,893 A * 1/1997 Byers .................. G06F 11/1441
                                                  713/330
5,796,376 A * 8/1998 Banks .................... G06F 3/147
                                                  345/1.3
(Continued)

FOREIGN PATENT DOCUMENTS

CA        2919391        7/2016

OTHER PUBLICATIONS

Wikipedia's Heat Sink historical version published Jan. 19, 2016 https://en.wikipedia.org/w/index.php?title=Heat_sink&oldid=700621692 (Year: 2016).*
(Continued)

*Primary Examiner* — Joseph O Schell
(74) *Attorney, Agent, or Firm* — Aspire IP, LLC; Scott J. Hawranek

(57) ABSTRACT

Embodiments of a multiple sign controller are generally described herein. Many embodiments include a multiple sign controller system. In some embodiments, the multiple sign controller can comprise a computer, a single instance of an operating system configured to run on the computer, two or more virtual sign controller instances, one or more physical communication ports coupled to the computer, and two or more virtual ports configured to run on the single instance of the operating system. In many embodiments, a first virtual port of the two or more virtual ports can be associated with a first virtual sign controller instance of the two or more virtual sign controller instances. Other embodiments may be described and claimed.

20 Claims, 4 Drawing Sheets

(51) Int. Cl.
  *G06F 11/16* (2006.01)
  *G06F 11/07* (2006.01)
  *G09F 9/305* (2006.01)

(56) References Cited

U.S. PATENT DOCUMENTS

| | | | |
|---|---|---|---|
| 6,061,349 A | 5/2000 | Coile et al. | |
| 7,469,346 B2 | 12/2008 | Watson | |
| 7,802,251 B2 | 9/2010 | Kitamura | |
| 8,193,662 B1 * | 6/2012 | Carlson | H02J 9/061 307/23 |
| 8,214,059 B1 | 7/2012 | Petrocy et al. | |
| 8,385,202 B2 | 2/2013 | Kuik et al. | |
| 8,446,293 B2 | 5/2013 | Stadjuhar, Jr. et al. | |
| 2006/0055641 A1 * | 3/2006 | Robertus | G06F 9/33 345/82 |
| 2008/0104871 A1 | 5/2008 | Stadjahat | |
| 2008/0151127 A1 * | 6/2008 | Ryou | H04N 7/163 348/739 |
| 2011/0012751 A1 * | 1/2011 | Jones | H04L 67/125 340/12.54 |
| 2011/0296055 A1 | 12/2011 | Kim et al. | |
| 2013/0113725 A1 | 5/2013 | Seo et al. | |
| 2013/0282154 A1 * | 10/2013 | Chappell | G05B 15/02 700/90 |
| 2013/0307975 A1 * | 11/2013 | Ford | B60Q 1/00 348/143 |
| 2014/0185627 A1 * | 7/2014 | Ditya | H04L 45/44 370/409 |
| 2015/0282337 A1 * | 10/2015 | Ekstrom | H01H 21/12 173/170 |
| 2017/0124866 A1 * | 5/2017 | Gattoni | G08G 1/081 |

OTHER PUBLICATIONS

Wikipedia's Variable-message sign historical version published Jan. 15, 2016 https://en.wikipedia.org/w/index.php?title=Variable-message_sign&oldid=699972065 (Year: 2016).*
Wikipedia's System on Module historical version published Jan. 26, 2016 https://en.wikipedia.org/w/index.php?title=System_on_module&oldid=701726203 (Year: 2016).*
Wikipedia's Uninterruptible Power Supply historical verion published Jan. 26, 2016 https://en.wikipedia.org/w/index.php?title=Uninterruptible_power_supply&oldid=701750714 (Year: 2016).*
Industrial Ethernet Cable: Should It Be Copper or Fiber? by Belden published Dec. 23, 2013 https://www.belden.com/blog/industrial-ethernet/industrial-ethernet-cable-should-it-be-copper-or-fiber (Year: 2013).*
Wikipedia's Log File historical version published Jan. 18, 2016 https://en.wikipedia.org/w/index.php?title=Log_file&oldid=700391632 (Year: 2016).*
"Do tower heatsinks put stress on the motherboard?" by Xenphor published Oct. 16, 2012 https://forums.anandtech.com/threads/do-tower-heatsinks-put-stress-on-the-motherboard.2276997/ (Year: 2012).*
"What to Look for in a Server Rack?" by Joel Coel published Jan. 18, 2013 https://serverfault.com/guestions/470534/what-to-look-for-in-a-server-rack (Year: 2013).*
"Use Processor Redundancy for Maximum Reliability" by Bill Krause published Feb. 1, 2002 https://www.eetimes.com/document.asp?doc_id=1277540 (Year: 2002)*
"How Capacitors Work" by Marshall Brain and Charles Bryant published Sep. 19, 2007 https://electronics.howstuffworks.com/capacitor.htm (Year: 2007)*
SCU6 Multi DMS Controller, www.ses-america.com, 2 pages.

* cited by examiner

400

405 - Monitoring, by a monitoring circuit, one or more communication channels associated with a computer, a respective communication channel of the one or more communication channels is associated with a respective different sign of two or more different signs.

410 - Determining, based at least in part on the monitoring, that communication is lost from any of the one or more communication channels.

415 - Resetting only the respective different sign with the lost communication.

FIG. 4

MULTIPLE SIGN CONTROLLER SYSTEM USING MULTIPLE VIRTUAL SIGN CONTROLLERS

CROSS-REFERENCE TO RELATED APPLICATIONS

The present application claims priority to U.S. Provisional Patent Application No. 62/110,507 entitled "Multiple Sign Controller," filed on Jan. 31, 2015, which is hereby incorporated by reference.

TECHNICAL FIELD

This disclosure relates generally to the field of signs, and more particularly to controllers for controlling signs.

BACKGROUND

Highway signs require controllers, which are specialized computers, to tell the signs what to display, communicate with a central office, and monitor the sign's systems. Historically, a separate physical controller has been necessary for each highway sign, because of the required processing power and the amount of heat generated. Unfortunately, these separate controllers are expensive and require environmentally controlled enclosures that take up valuable cabinet real estate. One possible solution is to use a number of computers (SBC) as controllers, one for each highway sign when multiple controllers are required to be placed in a single location. Unfortunately, this possible solution reduces the cost and real estate requirements only slightly, but generates significant amounts of heat. In addition, each SBC requires its own keyboard, display, and communication ports.

Thus there exists a need for a multi-sign controller that is inexpensive, generates a limited amount of heat, and does not require a lot of environmentally-controlled cabinet space.

BRIEF DESCRIPTION OF THE DRAWINGS

To facilitate further description of the embodiments, the following drawings are provided in which:

FIG. 4 illustrates a method for controlling one or more signs in accordance with another embodiment.

Figure 1:
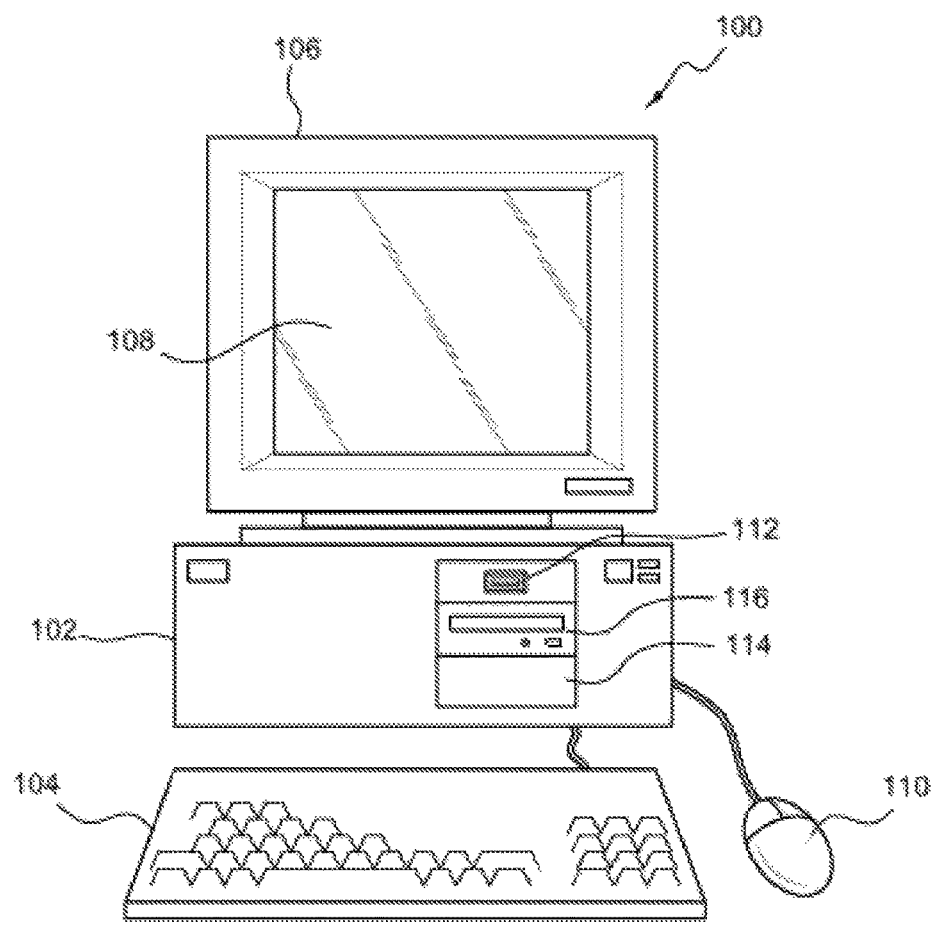
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Many embodiments include a multiple sign controller system. In some embodiments, the multiple sign controller can comprise a computer, a single instance of an operating system configured to run on the computer, two or more virtual sign controller instances, one or more physical communication ports coupled to the computer, and two or more virtual ports configured to run on the single instance of the operating system. In many embodiments, a first virtual port of the two or more virtual ports can be associated with a first virtual sign controller instance of the two or more virtual sign controller instances. In various embodiments, a second virtual port of the two or more virtual ports can be associated with a second virtual sign controller instance of the two or more virtual sign controller instances. In a number of embodiments, each of the two or more virtual sign controller instances can be associated with a different one of two or more different signs.

Various embodiments comprise a multiple sign controller system. In many embodiments, the multiple sign controller system can comprise a computer, a single instance of an operating system configured to run on the computer, and a plurality of virtual sign controller instances. In some embodiments, the multiple sign controller can further comprise one or more physical communication ports coupled to the computer, a capacitor coupled to the computer, and a plurality of virtual ports configured to run on the single instance of the operating system. In many embodiments, each virtual port of the plurality of virtual ports can be associated with a different virtual sign controller instance of the plurality of virtual sign controller instances and each of the plurality of virtual sign controller instances is associated with a different one of two or more different signs.

A number of embodiments comprise a method. In some embodiments, the method can comprise monitoring, by a monitoring circuit, one or more communication channels associated with a computer, a respective communication channel of the one or more communication channels is associated with a respective different sign of two or more different signs. In many embodiments, the method can further comprise determining, based on the monitoring, that communication is lost from any of the one or more communication channels and resetting only the respective different sign with the lost communication. In some embodiments, a single instance of an operating system can be configured to run on the computer, one or more physical communication ports are coupled to the computer, and two or more virtual ports are configured to run on the single instance of the operating system. In some embodiments, a first virtual port of two or more virtual ports can be associated with a first virtual sign controller instance of the two or more virtual sign controller instances, a second virtual port of the two or more virtual ports is associated with a second virtual sign controller instance of the two or more virtual sign controller instances, and each of the two or more virtual sign controller instances is associated with a different one of the two or more different signs.

Figure 2:
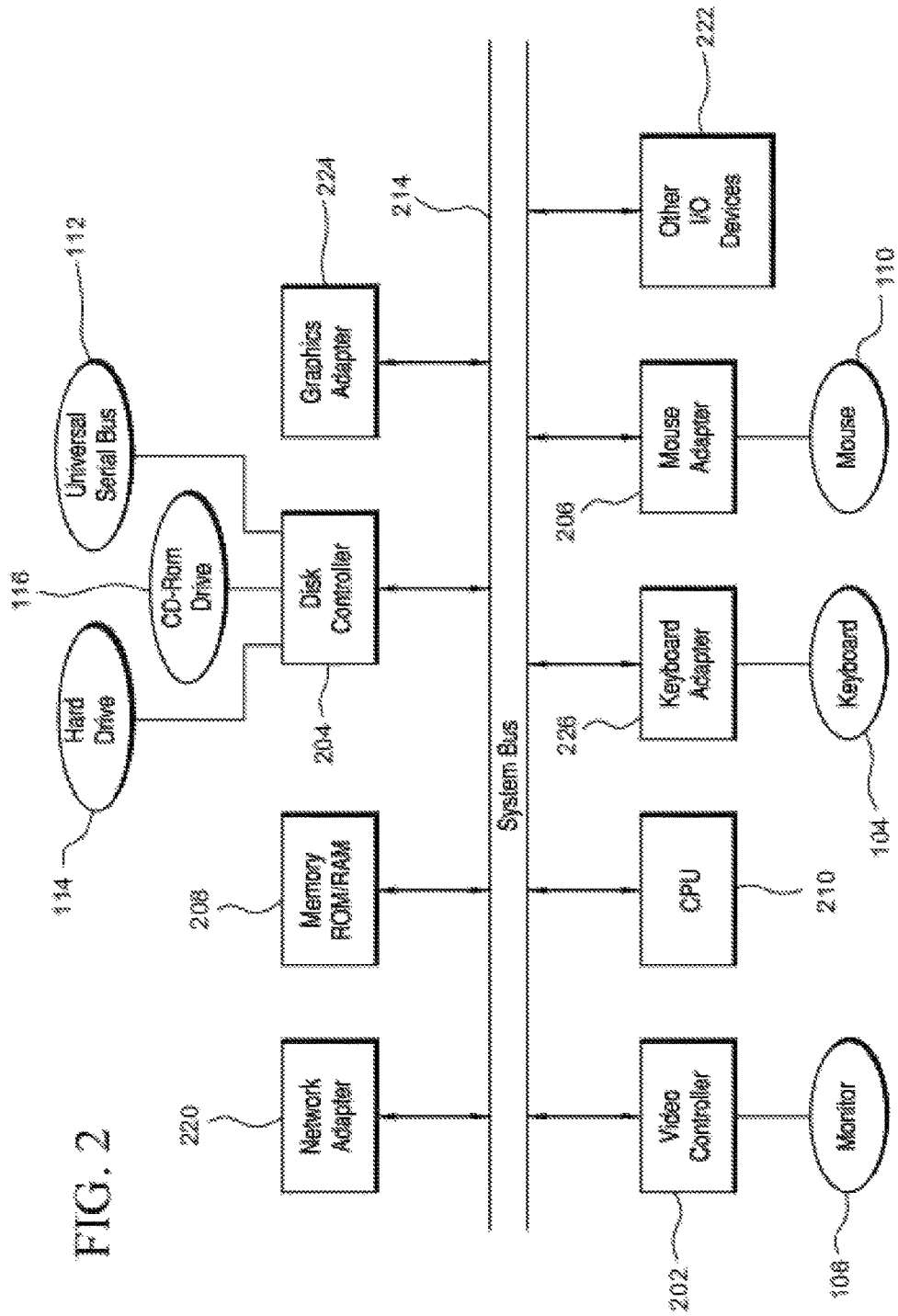
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone or a tablet. In certain additional embodiments, computer system 100 may comprise an embedded system.

Figure 3:
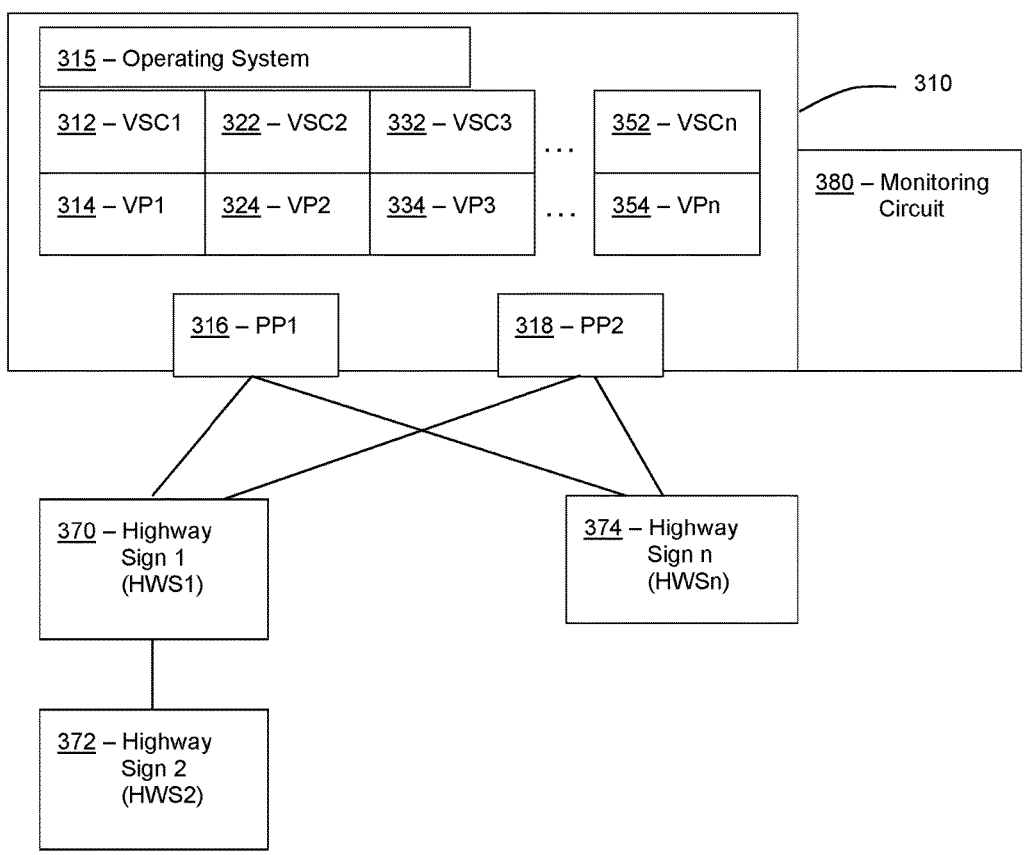
FIG. 3 is a system diagram of a multiple sign controller environment in accordance with one embodiment of the disclosure.

Skipping ahead now in the drawings, FIG. 3 illustrates a representative block diagram of a system 300, according to an embodiment. In many embodiments, system 300 can comprise a multiple sign controller system. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

FIG. 3 illustrates a system 300 according to an embodiment. In many embodiments, system 300 comprises a computer 310. In many embodiments, computer 310 can be similar to computer system 100 (FIG. 1). In some embodiments, computer 310 can be a single board computer. In many embodiments, computer 310 runs a single instance of an operating system 315. In some embodiments, the operating system can comprise a LINUX operating system. In some embodiments, the single instance of the operating system 315 can be configured to run on the computer. In many embodiments, two or more virtual sign controllers 312, 322, 332, 352 (VSC1 to VSCn) and/or instances of a virtual sign controller can run on top of the single instance of the operating system 315. In some embodiments, two or more virtual sign controller instances (e.g., 312, 322, 332, and/or 352) can be configured to run on the single instance of operating system 315 of computer 310. In some embodiments, approximately 2 to approximately 8 virtual sign controller instances (e.g., 312, 322, 332, and/or 352) can be configured to run on the single instance of operating system 315 of computer 310. In many embodiments, the single instance of operating system 315 of computer 310 can run up to approximately 40 instances of the two or more virtual sign controllers (e.g., 312, 322, 332, and/or 352). In some embodiments, the single instance of operating system 315 of computer 310 can run more than approximately 40 instances of the two or more virtual sign controllers (e.g., 312, 322, 332, and/or 352). As an example, in some embodiments, the two or more virtual sign controllers are not virtual machines because computer 310 is running only a single instance of an operating system. In this example, computer 310 is not running simultaneously multiple instances of one or more operating systems on which multiple virtual machines are running simultaneously.

In many embodiments, two or more virtual ports 314, 324, 334, and/or 354 (VP1 to VPn), can be configured to run on the single instance of operating system 315 and/or run on top of operating system 315. In many embodiments, each virtual sign controller of the two or more virtual sign controllers (e.g., 312, 322, 332, and/or 352) can have its own individual virtual port of the two or more virtual ports (e.g., 314, 324, 334, and/or 354) associated with it. In many embodiments, each virtual port of the two or more virtual ports (e.g., 314, 324, 334, and/or 354) has its own individual IP address.

In some embodiments, a first virtual port of the two or more virtual ports (e.g., 314) can be associated with a first virtual sign controller instance of the two or more virtual sign controller instances (e.g., 312) running on the single instance of operating system 315 on computer 310. In some embodiments, a second virtual port of the two or more virtual ports (e.g., 324) can be associated with a second virtual sign controller instance of the two or more virtual sign controller instances (e.g., 322) running on the single instance of operating system 315 on computer 310. In many embodiments, each virtual sign controller instance of the two or more virtual sign controller instances (e.g., 312, 322, 332, and/or 352) can be associated with two or more different highway signs 370, 372, and/or 374.

In some embodiments, one or more physical communication ports 316 and 318 can be coupled to computer 310. In some embodiments, computer 310 can have at least two physical communication ports (PP) 316 and 318 (PP1 and PP2). In some embodiments, physical communication port 316 can map to a portion of the two or more virtual ports (e.g., 314, 324, 334, and/or 354) through a virtual router or bridge (not shown), and out to highway signs 370, 372, and/or 374 (HWS1-HWSn). In some embodiments, physical communication port 318 can be National Transportation Communications for Intelligent Transportation Systems Protocol (NTCIP) compliant and can communicate with a central office or station that can be remote from computer 310 and highway signs 370, 372, and/or 374. In many embodiments, one or more physical communication ports 316 and/or 318 can be coupled to computer 310 using copper or multi-mode fiber.

Each of highway signs 370, 372, and/or 374 can be different from each other in many different ways such as, for example, by type, size, and/or function. For example, in some embodiments, highway signs 370, 372, and/or 374 can comprise at least two of a rotary sign, a scroll sign, or an light emitting diode (LED) sign. In some embodiments, highway signs 370, 372, and/or 374 can comprise different types of signs, for example one rotary sign and one scroll sign. In some embodiments, highway signs 370, 372, and/or 374 can comprise two LED signs. Furthermore, although the signs are described as highway signs, the signs also can be used in a non-highway environment, such as, for example, a lower speed road environment or even a non-road environment.

In some embodiments, system 300 also comprises one or more input devices (e.g., one or more keyboards, one or more keypads, one or more pointing devices such as a computer mouse or computer mice, one or more touchscreen displays, microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of system 300 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of system 300. In a similar manner, the processing module(s) and the memory storage module(s) can be local and/or remote to each other. In some embodiments, at least one of the two or more virtual sign controllers (e.g., 312, 322, 332, and/or 352) can be accessed through the one or more display devices and/or the one or more input devices.

In the same or different embodiments, system 300 can include a watchdog or monitoring circuit 380. In many embodiments, monitoring circuit 380 can be configured to perform method 400 (FIG. 4) as described below. In some embodiments, monitoring circuit 380 can determine if any of the two or more virtual sign controllers (e.g., 312, 322, 332, and/or 352) or one or more other parts of system 300 lock up, and if so, can perform a hard reset of at least a portion of system 300. In many embodiments, system 300 can further comprises one or more communication channels. In some embodiments, a respective communication channel of the one or more communication channels can be associated with a respective different highway sign of the two or more different highway signs such as highway signs 370, 372, and/or 374.

In some embodiments, monitoring circuit 380 can monitor the one or more communication channels and can determine if communication is lost from any of the one or more communication channels. In some embodiments, if communication is lost with a particular different highway sign (e.g., 370, 372 or 374) at the respective communication channel, monitoring circuit 380 can reset the particular highway sign (e.g., 370, 372 or 374) and/or initiate a reset of the particular highway sign (e.g., 370, 372 or 374). In many embodiments, only the particular highway sign (e.g., 370, 372 or 374) with the lost communication is reset. In some embodiments, monitoring circuit 380 resets only the particular highway sign (e.g., 370, 372 or 374) with the lost communication by initiating a shutdown process, starting a timer, and after the timer expires, removing power from the respective virtual sign controller instance (e.g., 312) associated with the particular highway sign (e.g., 370) that lost communication with the respective communication channel to reset the particular highway sign (e.g., 370). In some embodiments, the timer can be set for approximately 5 seconds to approximately 10 seconds. In some embodiments, the timer can be set for approximately 0.5 seconds to approximately 1.5 seconds. In some embodiments, after the timer expires, monitoring circuit 380 can remove power from the respective virtual sign controller instance associated with the particular highway sign that lost communication with the respective communication channel to reset the particular highway sign.

In some embodiments, system 300 can further comprise a capacitor coupled to computer 310. The capacitor can assist with the reset procedure described above. For example, the capacitor can operate as the timer described above for the reset procedure.

In another embodiment, system 300 can include a redundant computer to protect against hardware failures. In some embodiments, the redundant computer is fully redundant. In some embodiments, the redundant computer is internal to system 300, the traffic cabinet of the system 300, and/or the equipment rack of system 300.

In many embodiments, computer 310 can fit inside an equipment rack, and in many embodiments, the equipment rack is within a traffic cabinet. In one embodiment, computer 310 does not have a fan or any other active cooling system. In the same or different embodiments, the equipment rack and/or the traffic cabinet also do not have a fan or other active cooling system. Similarly, in many embodiments, system 300 also does not use or require a fan or any other active cooling system. In some embodiments, computer 310 and/or one or more associated printed circuit board assemblies are silicon conformal coated. In many embodiments, computer 310 and/or the one or more associated printed circuit board assemblies can be mounted vertically within the traffic cabinet and/or system 300.

In many embodiments, system 300 uses a single instance of operating system 315 and multiple instances of the virtual sign controller instance (e.g., 312, 322, 332, and/or 352) running on top of the single instance of operating system 315. This embodiment can reduce the amount of processing power necessary to provide multiple sign controllers for multiple highway signs, and also can reduce the amount of heat generated. In many embodiments, each instance of the virtual sign controller (e.g., 312, 322, 332, and/or 352) can be given its own IP address, and because system 300 uses virtual ports (e.g., 314, 324, 334, and/or 354), system 300 does not require extensive cabling and does not have other problems commonly created by multiple physical ports. In some embodiments, system 300 requires only one computer 310 and does not require or use a fan or other active cooling system because of its efficiency.

In many embodiments, each virtual sign controller instance (e.g., 312, 322, 332, and/or 352) can communicate with a Master Environmental Cabinet (MEC) instance (not shown) running on computer 310. The MEC instance can monitor the environmental conditions of the traffic cabinet in which computer 310 resides. For example, it monitors the temperature, the incoming voltage, humidity, etc. Thus, in many embodiments, system 300 can be inexpensive compared to prior systems, can generate a limited amount of heat, can use a limited, environmentally-controlled, cabinet space, and/or can control multiple signs (e.g., 370, 372, and/or 374) with a single computer (e.g., 310).

In some embodiments, system 300 can comprise a redundant power supply. In some embodiments, computer 310 can be coupled to a cabinet support board within the traffic cabinet of system 300, and monitoring circuit 380 (which also can be within the traffic cabinet of system 300) can monitor the power supply to computer 310. Monitoring circuit 380 can determine if the power supply is lost and, if the power supply is lost, can initiate a shutdown process for computer 310, where the shutdown process uses the capacitor (as described above) and/or the redundant power supply. In some embodiments, system 300 can further comprise one or more diagnostic sensors and a diagnostic log.

FIG. 4 illustrates a method 400. In many embodiments, method 400 can comprise a method for operating system 300, including monitoring circuit 380. In some embodiments, method 400 comprises monitoring, by a monitoring circuit, one or more communication channels associated with a computer, a respective communication channel of the one or more communication channels is associated with a respective different sign of two or more different signs (block 405), determining, based at least in part on the monitoring, that communication is lost from any of the one or more communication channels. (block 410), and resetting only the respective different sign with the lost communication (block 415). In one embodiment, the monitoring circuit can perform or at least assist with performing each block within method 400. In some embodiment, method 400 can further comprise resetting only the respective different sign with the lost communication by initiating a shutdown process, starting a timer, and after the timer expires, removing power from the respective sign controller instance associated with the respective different sign that lost communication with the respective communication channel to reset the respective different sign.

While the disclosure has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

Additional examples of such changes have been given in the foregoing description. Accordingly, the disclosure of embodiments of the multiple sign controller system is intended to be illustrative of the scope of highway variable message signs with apertures and is not intended to be limiting. For example, in one embodiment, FIGS. 3 and 4 are described with reference to highway signs, but FIGS. 3 and 4 also can be relevant to non-highway signs. As another example, when the computer (e.g., computer 310 (FIG. 3) comprises a system on a module (SOM), the SOM can include, for example, two or more different physical printed circuit board assemblies (PCBAs). Other permutations of the different embodiments having one or more of the features of the various figures are likewise contemplated. It is intended that the scope of the multiple sign controller system shall be limited only to the extent required by the appended claims.

The multiple sign controller system discussed herein may be implemented in a variety of embodiments, and the foregoing discussion of these embodiments does not necessarily represent a complete description of all possible embodiments. Rather, the detailed description of the drawings, and the drawings themselves, disclose at least one preferred embodiment of a multiple sign controller system, and/or highway variable message sign, and may disclose alternative embodiments of the same.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A multiple sign controller system, comprising:
  computational machinery, wherein the computational machinery comprises:
    instructions for a single instance of an operating system configured to execute on the computational machinery;
    instructions for a first virtual sign controller instance and a second virtual sign controller instance, wherein the first virtual sign controller instance and the second virtual sign controller instance are configured to execute on the operating system; and instructions for a first virtual port and a second virtual port, wherein the first virtual port is associated with the first virtual sign controller instance and the second virtual port is associated with the second virtual sign controller instance; and one or more physical communication ports coupled to the computational machinery for transmitting communication from the first virtual port and the second virtual port, wherein the first virtual sign controller instance is associated with a first group of two or more road signs and the second virtual sign controller instance is associated with a second group of two or more road signs, and wherein each of the road signs of the first group and each of the road signs of the second group are not shared by more than one group.

2. The multiple sign controller system of claim 1, wherein the computational machinery does not use a fan.

3. The multiple sign controller system of claim 1, wherein the road signs of the first group comprise at least two of a rotational sign; a scroll sign; or an LED sign.

4. The multiple sign controller system of claim 1, wherein the computational machinery comprises a system on module.

5. The multiple sign controller system of claim 1, further comprising:
a monitoring circuit; and
one or more communication channels.

6. The multiple sign controller system of claim 5, wherein the monitoring circuit resets the monitoring circuit resets one or more of the signs by initiating a shutdown by initiating a shutdown process; and starting a timer.

7. The multiple sign controller system of claim 1, further comprising:
a capacitor coupled to the computational machinery; and
a monitoring circuit;
wherein the computational machinery is coupled to a cabinet support board,
wherein the monitoring circuit monitors a power supply to the computational machinery, and
wherein if the monitoring circuit determines the power supply is lost has lost power, and if the power supply has lost power, initiates a shutdown process for the computational machinery, and the shutdown process uses the capacitor as a timer.

8. The multiple sign controller system of claim 1, further comprising:
computational equipment for internal redundancy.

9. The multiple sign controller system of claim 1, further comprising:
a redundant power supply.

10. The multiple sign controller system of claim 1, wherein at least one of the one or more physical communication ports are coupled to the computational machinery using at least one of copper and multi-mode fiber for communication.

11. The multiple sign controller system of claim 1, wherein the computational machinery is silicon conformal coated; and
the multiple sign controller system has an interior portion and an exterior portion, the computational machinery is mounted in the interior portion of the multiple sign controller system.

12. The multiple sign controller system of claim 1, further comprising:
one or more diagnostic sensors; and
data storage for a diagnostic log.

13. A multiple sign controller system, comprising:
computational machinery, wherein the computational machinery comprises:
instructions for a single instance of an operating system configured to execute on the computational machinery;
instructions for a plurality of virtual sign controller instances, wherein the plurality of virtual sign controller instances includes at least a first virtual sign controller instance and a second virtual sign controller instance each configured to execute on the single instance of the operating system; and
instructions for a first virtual port and a second virtual port, wherein the first virtual port is associated with the first virtual sign controller instance and the second virtual port is associated with the second virtual sign controller instance; and
one or more physical communication ports coupled to the computational machinery for transmitting communication from the first virtual port and second virtual port,
wherein the first virtual sign controller instance is associated with a first group of two or more road signs and the second virtual sign controller instance is associated with a second group of two or more road signs, and
wherein each of the road signs of the first group and each of the road signs of second group are not shared by more than one group.

14. The multiple sign controller system of claim 13, wherein the road signs of the second group comprise at least two of: a rotational sign; a scroll sign; or an LED sign.

15. The multiple sign controller system of claim 13, wherein the computational machinery comprises a system on module.

16. The multiple sign controller system of claim 13, further comprising:
a monitoring circuit; and
one or more communication channels.

17. The multiple sign controller system of claim 16, wherein the monitoring circuit is configured to reset the road signs of the first group and second group by:
initiating a shutdown process; and
starting a timer.

18. The multiple sign controller system of claim 13, further comprising:
a monitoring circuit;
wherein the computational machinery is coupled to a cabinet support board; and
the monitoring circuit:
monitors a power supply to the computational machinery;
determines if the power supply has lost power; and if the power supply lost power, initiates
a shutdown process for the computational machinery; and
the shutdown process uses the capacitor as a timer.

19. A method, comprising:
monitoring, using computational equipment for a monitoring circuit, two or more communication channels, wherein a first communication channel of the one or more communication channels is associated with a first group of one or more road signs and a second communication channel of the one or more communication channels is associated with a second group of one or more road signs, and wherein the road signs of the first and second groups are different;

determining, based on the monitoring, that communication of the first communication channel is lost with a first virtual sign controller instance; and resetting only the first group of road signs, wherein the first virtual sign controller instance executes on an operating system executed on computer machinery, wherein communication of the second communication channel with a second virtual sign controller instance is maintained, wherein a first virtual port executed on the computational machinery is associated with the first virtual sign controller instance and the second virtual port executed on the computational machinery is associated with the second virtual sign controller instance, and wherein the first and second communication channels are maintained on one or more physical communication ports coupled to the computational machinery for transmitting communication from the first virtual port and the second virtual port.

20. The method of claim 19, wherein the monitoring circuit resets only the first group of road signs by initiating a shutdown process; and starting a timer.

* * * * *

UNITED STATES PATENT AND TRADEMARK OFFICE
CERTIFICATE OF CORRECTION

PATENT NO. : 10,289,429 B2
APPLICATION NO. : 15/009185
DATED : May 14, 2019
INVENTOR(S) : Robert Charles Stadjuhar, Jr.

Page 1 of 1

It is certified that error appears in the above-identified patent and that said Letters Patent is hereby corrected as shown below:

In the Claims

Claim 6, Column 11, Line 30, replace "the monitoring circuit resets the monitoring circuit resets one" with -- the monitoring circuit resets one --

Claim 7, Column 11, Line 42, delete "is lost" and add, -- supply has lost power --

Signed and Sealed this
Third Day of September, 2019

Andrei Iancu
*Director of the United States Patent and Trademark Office*